United States Patent
Rapparini

(10) Patent No.: US 10,040,587 B2
(45) Date of Patent: Aug. 7, 2018

(54) MACHINE AND METHOD FOR ARRANGING OBJECTS IN AN ALTERNATE MANNER IN SINGLE FILE ROWS

(71) Applicant: ICA S.p.A., Bologna (IT)

(72) Inventor: Gino Rapparini, Bologna (IT)

(73) Assignee: ICA S.p.A., Bologna (IT)

( * ) Notice: Subject to any disclaimer, the term of this patent is extended or adjusted under 35 U.S.C. 154(b) by 434 days.

(21) Appl. No.: 14/868,599

(22) Filed: Sep. 29, 2015

(65) Prior Publication Data

US 2016/0096642 A1    Apr. 7, 2016

(30) Foreign Application Priority Data

Oct. 2, 2014  (IT) .............................. BO2014A0541
Aug. 27, 2015  (EP) .................................... 15182748

(51) Int. Cl.
*B65B 35/54* (2006.01)
*B65G 47/84* (2006.01)
(Continued)

(52) U.S. Cl.
CPC .............. *B65B 35/54* (2013.01); *B65B 29/02* (2013.01); *B65B 29/022* (2017.08); *B65B 35/32* (2013.01);
(Continued)

(58) Field of Classification Search
CPC ....... B65B 21/025; B65B 35/32; B65B 35/46; B65B 35/50; B65B 35/54; B65B 35/56;
(Continued)

(56) References Cited

U.S. PATENT DOCUMENTS 2,108,280 A  *  2/1938  Wright .................... B65B 35/46
                                                   198/374
2,848,855 A  *  8/1958  Ervine et al. ......... F42B 33/002
                                                   198/374
(Continued)

FOREIGN PATENT DOCUMENTS

DE          706184 C  *  5/1941  ............. B65B 35/50
DE          739618 C  *  10/1943  ............. B65B 35/54
(Continued)

OTHER PUBLICATIONS

Italian search report dated Jun. 3, 2015 in corresponding Italian Application No. BO2014A000541, 8 pages.

*Primary Examiner* — Stephen F Gerrity
(74) *Attorney, Agent, or Firm* — Fattibene and Fattibene LLC; Paul A. Fattibene

(57) ABSTRACT

A machine (M) and a method for arranging objects (T, T1, T2) comprising a first end (Te) and a projecting edge (Tb) arranged in proximity to the first end, in an alternate manner along single file rows (F). The objects are oriented so that they rest on the first end and are divided into a first group (A) and a second group (B). The first group are moved in an anti-clockwise direction along a first arc of circumference (C1) and, simultaneously, the second group are moved in a clockwise direction along a second arc of circumference (C2). The objects (T1) of the first group and the objects (T2) of the second group are dropped in turn along the same direction (Y). The objects (T, T1, T2) are stacked on top of one another in an alternate manner along single file rows (F).

18 Claims, 12 Drawing Sheets

(51) Int. Cl.

| | | |
|---|---|---|
| *B65G 57/081* | (2006.01) | |
| *B65B 35/50* | (2006.01) | |
| *B65B 35/56* | (2006.01) | |
| *B65B 35/32* | (2006.01) | |
| *B65B 29/02* | (2006.01) | |
| *B65D 77/04* | (2006.01) | |
| *B65D 85/62* | (2006.01) | |
| *B65D 85/804* | (2006.01) | |

(52) U.S. Cl.
CPC ............. *B65B 35/50* (2013.01); *B65B 35/56* (2013.01); *B65D 77/04* (2013.01); *B65D 85/62* (2013.01); *B65D 85/8043* (2013.01); *B65G 47/846* (2013.01); *B65B 2220/16* (2013.01); *B65G 57/081* (2013.01)

(58) Field of Classification Search
CPC .... B65B 35/58; B65G 47/248; B65G 47/846; B65G 57/081
USPC ......... 53/446, 447, 142, 143, 154, 540, 544; 198/374, 383, 389, 390, 392, 394, 402, 198/406; 414/791.2, 791.3, 791.7, 792
See application file for complete search history.

(56) References Cited

U.S. PATENT DOCUMENTS

| | | | | |
|---|---|---|---|---|
| 3,143,223 | A | 8/1964 | McIntyre et al. | |
| 3,253,694 | A | 5/1966 | Kinney | |
| 4,002,005 | A | 1/1977 | Mueller et al. | 53/26 |
| 4,067,433 | A | 1/1978 | Phipps | 198/374 |
| 4,530,435 | A * | 7/1985 | Stohlquist | B65B 35/58 |
| | | | | 198/374 |
| 4,555,892 | A * | 12/1985 | Dijkman | B65B 5/105 |
| | | | | 198/374 |
| 4,771,589 | A | 9/1988 | Mueller et al. | 53/446 |
| 4,901,502 | A * | 2/1990 | Colamussi | B65B 35/54 |
| | | | | 53/143 |
| 6,349,526 | B1 | 2/2002 | Newman | 53/446 |
| 7,093,705 | B2 | 8/2006 | Ohiro et al. | 198/377.08 |
| 2017/0036865 | A1* | 2/2017 | Sassi et al. | B65B 35/58 |

FOREIGN PATENT DOCUMENTS

| | | | | |
|---|---|---|---|---|
| EP | 0018599 | A1 * | 11/1980 | ............ B65B 21/04 |
| EP | 0259216 | A1 * | 3/1988 | ............ B65G 47/24 |
| EP | 2 465 783 | | 6/2012 | |
| FR | 1505568 | A * | 12/1967 | ............ B65B 35/54 |
| WO | WO 99/12664 | | 3/1990 | |
| WO | WO 2014/040960 | | 3/2014 | |

* cited by examiner

MACHINE AND METHOD FOR ARRANGING OBJECTS IN AN ALTERNATE MANNER IN SINGLE FILE ROWS

FIELD OF THE INVENTION

The present invention concerns the field of machines for arranging objects in single file rows, for the subsequent packing thereof. More specifically, the present invention concerns the field of machines for arranging objects comprising a first end and a projecting edge arranged close to the first end, for example beverage capsules, in an alternate manner in single file rows.

BACKGROUND OF THE INVENTION

Arranging objects in single file rows is useful in order to reduce the space occupied by the objects themselves, so as to be able to pack them in packages that are the least bulky possible.

The state of the art discloses various devices for arranging objects comprising a first end and a projecting edge arranged in proximity to the first end, for example capsules for preparing beverages like coffee or similar, in single file rows for subsequent packaging thereof.

Known devices, however, have various drawbacks. Often, indeed, known devices are complicated and expensive to make. Moreover, known devices from the state of the art are bulky. Indeed, they foresee the use of structures, of the rail type, for transporting the objects that are long and follow articulated paths.

Therefore, the purpose of the present invention is to at least partially solve the aforementioned problems.

More specifically, the purpose of the present invention is to provide a machine for arranging objects, comprising a first end and a projecting edge arranged close to the first end in an alternate manner in single file rows, which is simple and cost-effective to make. Another purpose of the present invention is to provide a machine that is not bulky and therefore foresees short and simple paths for the objects to be organised. Another purpose of the present invention is to provide a method for arranging objects, comprising a first end and a projecting edge arranged close to the first end in an alternate manner in single file rows, which is simple and efficient.

SUMMARY OF THE INVENTION

According to an embodiment of the present invention, a machine for arranging objects is provided comprising a first end and a projecting edge arranged in proximity to the first end, in an alternate manner along single file rows, comprising: first transportation means for transporting a first group of objects and second transportation means for transporting a second group of objects; first moving means suitable for receiving the objects of the first group from the first transportation means and for moving the objects belonging to the first group in an anti-clockwise or counter-clockwise direction along a first arc of circumference defined on a first plane; second moving means suitable for receiving the objects of the second group from the second transportation means and for moving the objects belonging to the second group in a clockwise direction along a second arc of circumference defined on a second plane parallel to the first plane; collecting and dropping means suitable for receiving the objects of the first group from the first moving means and the objects of the second group from the second moving means and for making them fall along the same direction, preferably perpendicular to the ground, the collecting and dropping means comprising first rotation means suitable for rotating the objects of the first group in a clockwise direction along a third arc of circumference during falling, for example so that, at the end of the rotation, the objects no longer rest on the first end and second rotation means suitable for rotating the objects of the second group in an anti-clockwise direction along a fourth arc of circumference during falling, for example so that, at the end of the rotation, the objects no longer rest on the first end, the third arc of circumference and the fourth arc of circumference being defined on a plane perpendicular with respect to the first plane and to the second plane, so as to stack the objects on top of one another in an alternate manner along single file rows. In this way, the objects are arranged on top of one another so as to occupy the least space possible and are ready to be suitably packed. Moreover, the path followed by each object is short and simple and the machine according to the present invention occupies little space and comprises elements that are simple and inexpensive to make.

In the present application, the expression "stack in an alternate manner" refers to the orientation with which the objects are organised one on top of the other. In particular, the objects are arranged on top of one another so as to be substantially parallel to each other. However, the objects are oriented in an opposite manner. In particular, the corresponding ends of adjacent objects points in opposite directions. In other words, the objects are oriented so that, for example, if the first end of a first object points to the right, then the first end of a second object, adjacent to the first object and arranged directly above or directly below it, points to the left, and vice-versa. This alternate structure repeats along the entire organised stack. In other words, the projecting edge of the first end of the first object is in contact with the second end of the second object adjacent to the first object, i.e. with the opposite end with respect to the first end. In turn, the second end of the second object is in contact with the projecting edge of the first end of the third object and so on.

According to a further embodiment of the present invention, a machine is provided in which the rotation in a clockwise direction of the objects of the first group along the third arc of circumference and the rotation in an anti-clockwise direction of the objects of the second group along the fourth arc of circumference are substantially by 90°. In this way, exploiting gravity, the objects can substantially pass from a position in which they are perpendicular to the ground, thus resting on their first end to a position in which they are substantially parallel to the ground.

According to a further embodiment of the present invention, a machine is provided in which the first plane and the second plane are parallel to the ground. In this way, the machine is rendered even simpler to make. This makes it possible to exploit gravity in the dropping step.

According to a further embodiment of the present invention, a machine is provided in which the first plane and the second plane coincide. In this way, the machine is made even simpler to make.

According to a further embodiment of the present invention, a machine is provided in which the first moving means and/or the second moving means comprise a toothed wheel suitable for housing each of the objects in the space between one tooth and the other of the toothed wheel during the movement of the objects. For example, according to an embodiment of the present invention, the first moving means comprise a toothed wheel suitable for housing each of the objects in the space between one tooth and the other of the toothed wheel during the movement of the objects and the second moving means comprise a toothed wheel suitable for housing each of the objects in the space between one tooth and the other of the toothed wheel during the movement of the objects. The known toothed wheels from the state of the art are objects commonly used and therefore easy and cost-effective to make. According to the present invention, the objects may be input into the toothed wheels by the first and/or the second transportation means along various directions. For example, the objects to be arranged in an alternate manner in single file rows may be input into the toothed wheels along a radial direction, namely along a direction which is substantially coincident with the direction of one of the radiuses of the circumference defined by the toothed wheel during its rotation. Moreover, according to a particularly advantageous embodiment of the present invention, the objects may be input into the toothed wheels along a tangential direction, namely along a direction which is coincident with a tangent of the circumference defined by the toothed wheel during its rotation. This embodiment is particularly advantageous because the introduction of the objects to be arranged in an alternate manner along single file rows between the teeth of the toothed wheels is improved. In particular, this embodiment allows minimizing the probability that some of the gaps between the teeth of one or both of the toothed wheels are not occupied by objects to be arranged.

According to a further embodiment of the present invention, a machine is provided in which the first rotation means comprise an arched slit suitable for housing the projecting edge of the objects belonging to the first group during the rotation and/or the second rotation means comprise an arched slit suitable for housing the projecting edge of the objects belonging to the second group during the rotation. In this way, it is ensured that the objects follow the profile of the rotation means and that they therefore rotate suitably in a simple manner.

According to a further embodiment of the present invention, a machine is provided in which the collecting and dropping means comprise a guide, for example a vertical guide, suitable for containing at least one single file row of objects. In this way the objects stacked in an alternate manner along the guide are ready and available for subsequent packaging.

According to a further embodiment of the present invention, a machine is provided comprising first blocking means suitable for blocking the falling of the objects in the single file row. In this way, the objects arranged in single file row are prevented from accidentally falling. Moreover, the first blocking means allow different objects to be stacked inside the guide.

According to a further embodiment of the present invention, a machine is provided further comprising second blocking means suitable for dividing the single file row of objects into groups having a predetermined number of objects. In this way, it is possible to select, in a quick and easy manner, the number of objects that are wished to be packed in the same package.

According to a further embodiment of the present invention, a machine is provided comprising actuation means, for example an electric motor, suitable for moving, preferably in a synchronous manner, the first transportation means and the second transportation means and the first moving means and the second moving means. The actuation means ensure that the means that take care of transportation and movement of the objects move in a suitable manner, for example at constant speed.

According to a further embodiment of the present invention, a method for arranging objects is provided, comprising a first end and a projecting edge arranged in proximity to the first end, in an alternate manner along single file rows, comprising the following steps: orienting the objects so that they rest on the first end; dividing the objects into a first group of objects and a second group of objects; moving the objects belonging to the first group in an anti-clockwise direction along a first arc of circumference defined on a first plane and, simultaneously, moving the objects belonging to the second group in a clockwise direction along a second arc of circumference defined on a second plane parallel to the first plane; dropping the objects belonging to the first group and the objects belonging to the second group in turn along the same direction, preferably perpendicular to the ground; rotating, during the dropping step, the objects belonging to the first group in a clockwise direction along a third arc of circumference so that, at the end of the rotation, they no longer rest on the first end and rotating, during the dropping step, the objects belonging to the second group in an anti-clockwise direction along a fourth arc of circumference so that, at the end of the rotation, they no longer rest on the first end, the third arc of circumference and the fourth arc of circumference being defined on a plane perpendicular with respect to the first plane and to the second plane, so as to stack the objects on top of one another in an alternate manner along single file rows. The method makes it possible to effectively and quickly stack a large number of objects, comprising a first end and a projecting edge arranged close to the first end, in an alternate manner along single file rows.

In the present application, the expression "drop in turns" indicates that one object belonging to the first group and an object belonging to the second group and so on are dropped alternately.

According to a further embodiment of the present invention, the rotation of the objects along the third arc of circumference and along the fourth arc of circumference during falling is a rotation substantially by 90°. The objects can thus pass from a vertical orientation, in which they rest on the first end, to a substantially horizontal orientation.

According to a further embodiment of the present invention, a method is provided in which the objects are frusto-conical. Especially in this case, it is very important for the objects to be stacked in an alternate manner, because, in this way, it is possible to reduce the total space occupied by the objects, and thus to pack them in compact packages having dimensions that are as small as possible.

According to a further embodiment of the present invention, a method is provided in which the objects are capsules for producing beverages. For example, the capsules can contain infusion products, like coffee powder or tea leaves, or soluble products like powdered milk or cocoa. It is very important, therefore, to pack the capsules well, quickly and effectively and so that they occupy little space overall.

According to a further embodiment of the present invention, a method is provided in which the first plane and the second plane are parallel to the ground. In this way, the force of gravity is exploited in the falling step.

According to a further embodiment of the present invention, a method is provided in which the first plane and the second plane coincide.

According to a further embodiment of the present invention, a method is provided in which the movement of the objects belonging to the first group along the first arc of circumference is offset with respect to the movement of the objects belonging to the second group along the second arc of circumference. In this way, the objects belonging to the first group and the objects belonging to the second group are, in turn, i.e. alternately, ready for the subsequent falling step. In this way, there is continuous alternate falling of an object belonging to the first group and an object belonging to the second group and so on.

According to a further embodiment of the present invention, a method is provided in which the projecting edge of the objects is housed in arched slits during the step of rotation of the falling step. In this way, it is ensured that the objects follow the profile of the arched slits and thus rotate suitably in a simple manner.

According to a further embodiment of the present invention, a method for packing a predetermined number of objects arranged in an alternate manner along single file rows in a package is provided, comprising arranging the objects in an alternate manner along single file rows according to one of the methods based on the present invention. In this way, packages are obtained having small and compact dimensions and the inner volume of which is occupied effectively.

BRIEF DESCRIPTION OF THE DRAWINGS

The present invention will be described with reference to the attached figures in which the same reference numerals and/or markings indicate the same parts and/or similar and/or corresponding parts of the system.

DETAILED DESCRIPTION OF THE INVENTION

Hereafter, the present invention is described with reference to particular embodiments, as illustrated in the attached drawings. However, the present invention is not limited to the particular embodiments described in the following detailed description and represented in the figures, but rather the embodiments described simply exemplify the various aspects of the present invention, the purpose of which is defined by the claims. Further modifications and variations of the present invention will be clear to those skilled in the art.

FIGS. 2 to 6 show a machine for arranging objects T, comprising a first end Te and a projecting edge Tb arranged in proximity to the first end Te, in an alternate manner along single file rows F, in various steps of its use.

According to an embodiment of the present invention, the machine M can stack up to 1200 objects T per minute.

Figure 1A:
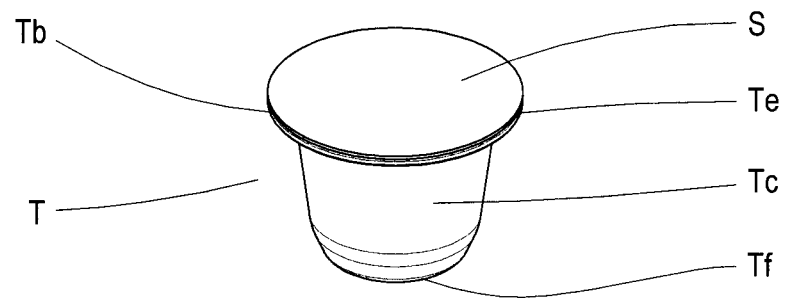
FIG. 1a schematically illustrates a 3D or perspective view of an object comprising a first end and a projecting edge arranged near to the first end.

Objects T of the type indicated can comprise capsules for producing beverages, for example of the espresso type, like those shown schematically in FIG. 1a.

The capsule shown in FIG. 1a comprises a frusto-conical body Tc, a first end Te from which an edge Tb projects towards the outside of the body Tc and a second end Tf corresponding to the bottom of the capsule. The soluble and/or infusion product for producing beverages, for example ground coffee, is contained inside the body Tc of the capsule. The capsule is hermetically closed by a sealing element S (visible in FIG. 1a), welded to the projecting edge Tb at the first end Te of the capsule.

Figure 1B:
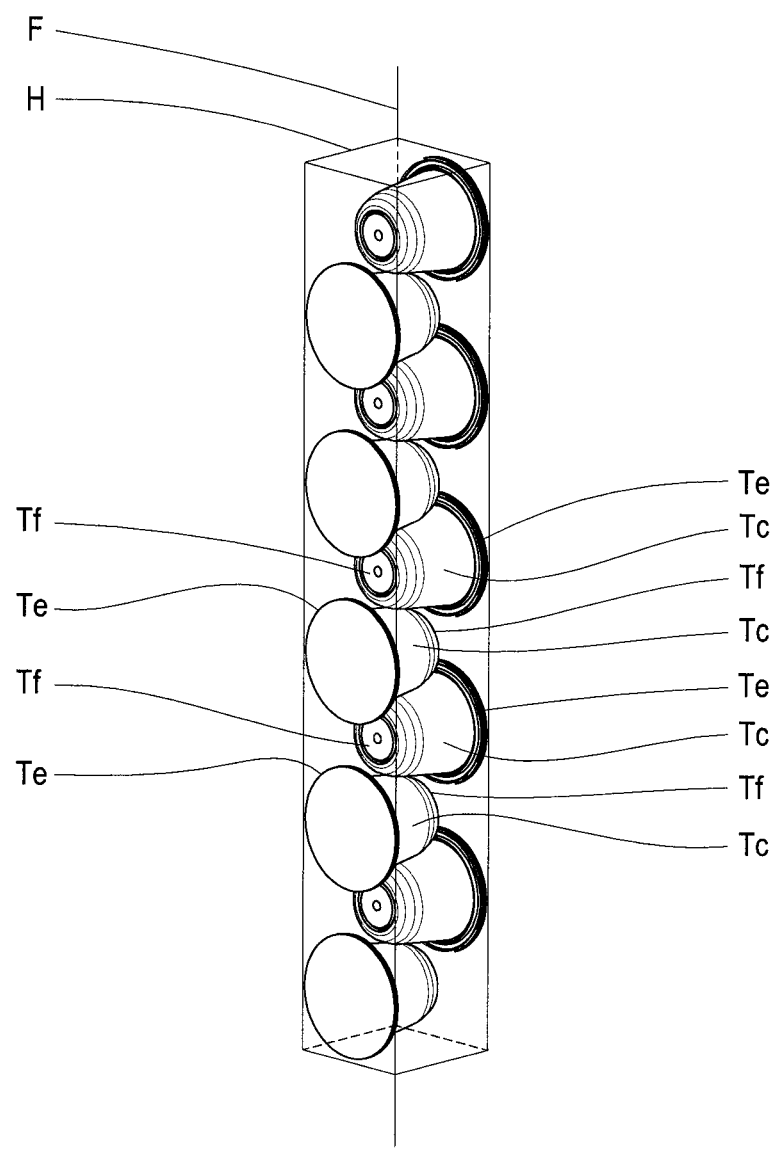
FIG. 1b schematically illustrates a 3D or perspective view of an example package comprising objects arranged alternately in a single file row, by the machine and/or by means of the method for arranging objects in an alternate manner along single file rows, according to the present invention.

FIG. 1b shows an example of a package in which the capsules shown in FIG. 1a are arranged in an alternate manner along a single file row F, through the use of the machine and/or of the method according to the present invention.

The package H shown in the figures comprises ten capsules arranged along a single file row F, in an alternate manner.

In particular, the capsules are arranged on top of one another so as to be substantially parallel to each other. However, the capsules are oriented in an opposite manner. In particular, the corresponding ends of adjacent capsules point in opposite directions. In other words, the capsules are oriented so that the projecting edge Tb arranged in proximity to the first end Te of the first capsule is in contact with the second end Tf of the second capsule, which is in turn in contact with the projecting edge Tb arranged in proximity to the first end Te of the third capsule and so on. This alternate structure repeats along the entire single file row.

Even more specifically, the bodies Tc of the capsules are in contact with each other and the first end Te of the first capsule is in contact with the second end Tf of the second capsule, which in turn is in contact with the first end Te of the third capsule and so on. In this way, as can be seen in the figures, the stacking space is optimised.

The objects T, in order to be arranged in an alternate manner along single file rows, are oriented so that they rest on their first end Te, then are divided into two groups, for example a first group A and a second group B.

The operations of orientation and division of the objects T can be carried out in the quoted order or, alternatively, in reverse order.

The operations of orientation and division into two groups A and B of the objects T takes place through orientation means and dividing means not shown in the figures, since they are not necessarily included in the machine M according to the present invention.

Based on the present invention, the objects T reach the respective transportation means 1, 2 of the machine M all oriented in the same direction and on two distinct rows.

The machine M comprises first transportation means 1 for transporting the first group A of objects T1 oriented so that they rest on their first end Te and second transportation means 2 for transporting the second group B of objects T2 oriented so that they rest on their first end Te.

In the embodiment shown in the figures, the first transportation means 1 and the second transportation means 2 comprise, for example, two parallel conveyor belts.

According to further embodiments of the present invention, the first transportation means and the second transportation means may comprise a single conveyor belt running beneath a system of conveyor tracks or guides which branches at a branching point in a first system of tracks or guides and a second system of tracks or guides. An example of such an embodiment of the present invention is shown in FIGS. 7 to 10. The object T run along the tracks system 30 thanks to the movement of the single conveyor belt 20 which may move as schematically shown by arrow F1 in FIG. 10. The surface of the conveyor belt 20 may for example be milled or configured so as to allow trailing of the objects T by means of friction forces. Movable directing means 41 which are adapted to alternately direct the objects T from the system of conveyor tracks 30 towards the first tracks system 31 or the second tracks system 32 may be provided at the branching point 40. For example, in the system shown in FIGS. 7 to 10, the branching point is provided with a directing lever 41 which is movable as schematically shown by arrow F2 in the enlargement of FIG. 8. The movement of the movable directing means or directing lever 41 allows directing the objects T towards the first tracks system 31 (so as to form the first group A of objects T1) or towards the second tracks system 32 (so as to form the second group B of objects T2). In this embodiment the movement of a single conveyor belts thus allows splitting the objects T in two groups and to direct the objects of the two groups towards the first and second moving means by means of the first tracks system and the second tracks system, respectively.

Figure 8:
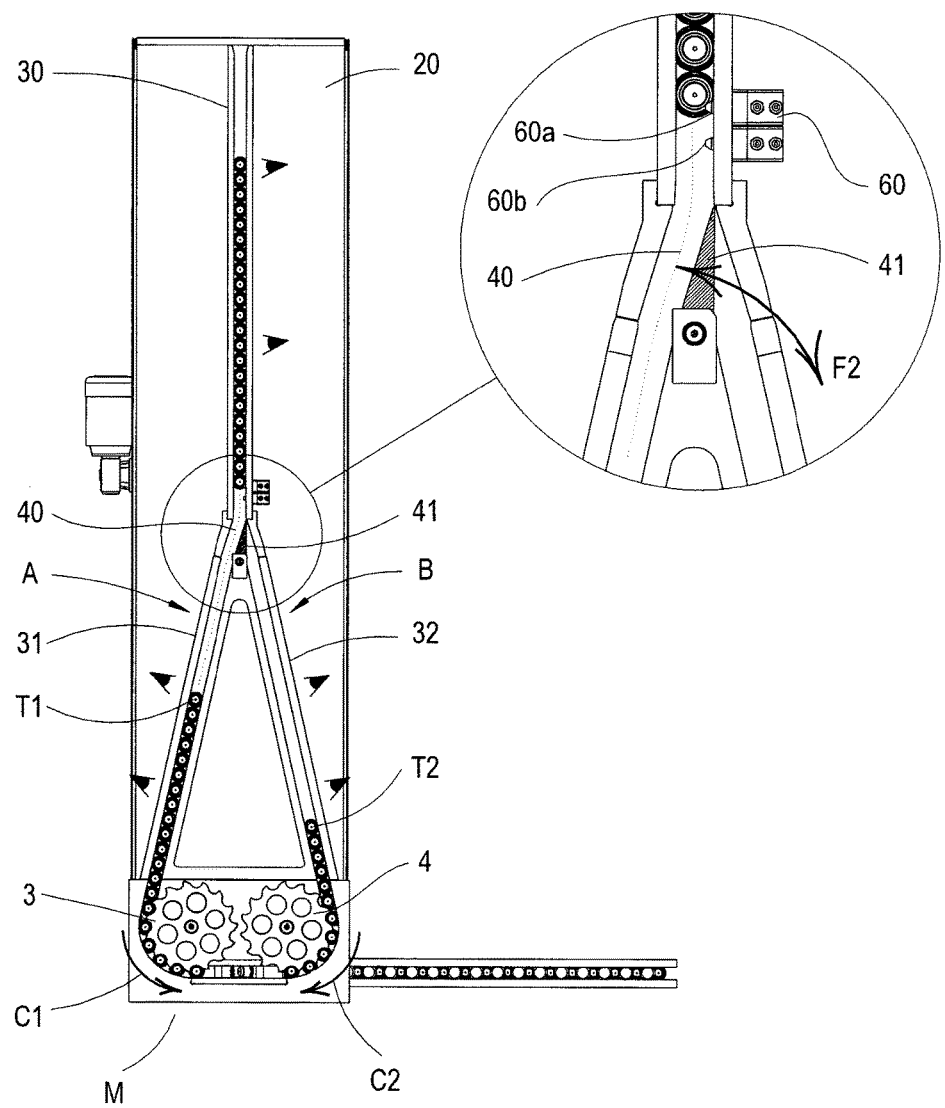
FIG. 8 schematically illustrates the system of FIG. 7 with an enlargement of a detail of the machine according to an embodiment of the present invention.
Figure 9:
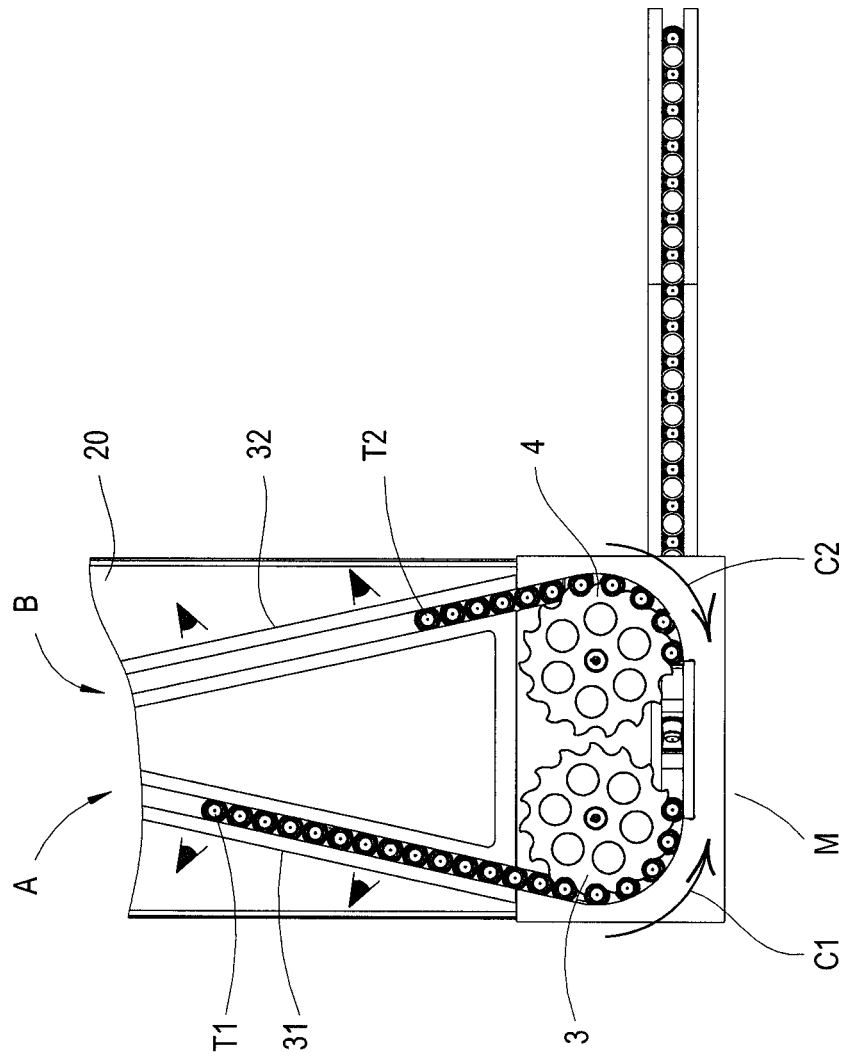
FIG. 9 schematically illustrates an enlargement of a portion of the system shown in FIG. 7.

The transportation means may be provided with means for detecting the transit of objects 50, for example photocells. Detecting means may be provided both along the conveyor tracks system 30 and along the first track system 31 and the second track system 32. Moreover, the transportation means may be provided with control means for controlling the transit of objects by means of the control means which are configured to operate according to the result of the detection of the transit of objects. The control means for controlling the transit of objects may comprise barrier means adapted to stop the transit of objects along the guides. The enlargement of FIG. 8 shows that the barrier means 60 for controlling the transit of objects T comprise a first element 60a and a second element 60b. The first and the second element 60a and 60b are movable so as to stop the transit of objects T along the conveyor tracks system 30. The presence of two elements 60a and 60b guarantees that the objects T are effectively stopped, even if for example one of the objects is directly in proximity of one of the two elements during the transit.

According to further embodiments of the present invention, the first transportation means 1 and the second transportation means 2 can, alternatively, be positioned along directions that form an angle comprised between 0° and 180° between them. For example, the two conveyor belts do not necessarily have to be parallel to each other, but they can also extend along inclined directions, for example perpendicular. Moreover, the two conveyor belts can also extend along the same line but reach the moving means 3 and 4, respectively, along opposite directions.

Figure 2:
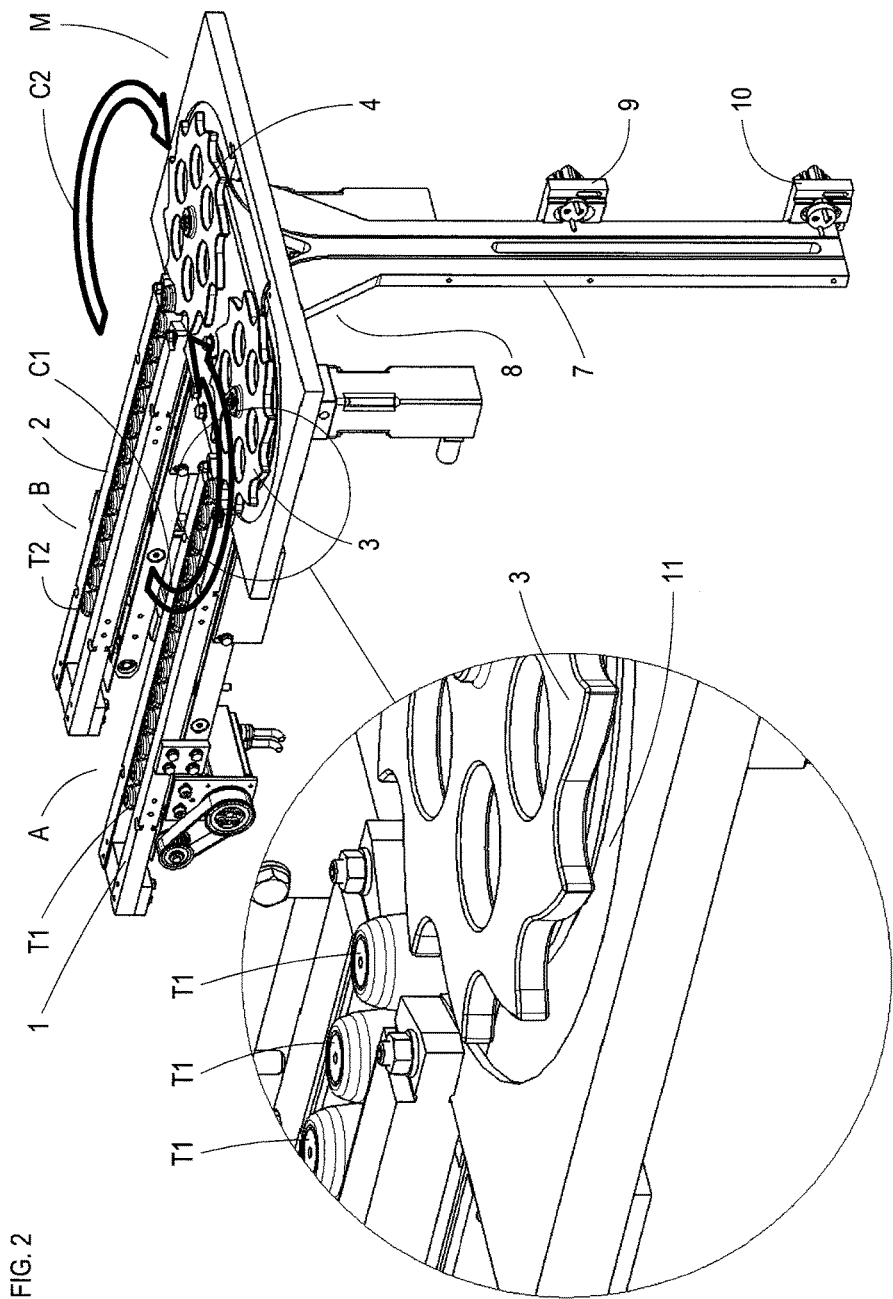
FIG. 2 schematically illustrates a 3D or perspective view of a machine for arranging objects, according to an embodiment of the present invention, in a first step of use.

In FIG. 2 the objects T1 belonging to the first group A and the objects T2 belonging to the second group B are shown, respectively, on the first transportation means 1 and on the second transportation means 2.

The first transportation means 1 and the second transportation means 2 carry the objects T1 belonging to the first group A and the objects T2 belonging to the second group B, towards the first moving means 3 and towards the second moving means 4, respectively.

The first moving means 3 are suitable for receiving the objects T1 of the first group A from the first transportation means 1 and for moving them in an anti-clockwise direction along a first arc of circumference C1 defined on a first plane X1.

The second moving means 4 are suitable for receiving the objects T2 of the second group B from the second transportation means 2 and for moving them in a clockwise direction along a second arc of circumference C2 defined on a second plane X2 parallel to the first plane X1.

The first plane X1 and the second plane X2 are, in the embodiment shown, parallel to the ground and coincide with each other.

The first plane X1 and the second plane X2 can, alternatively, be on different planes parallel to each other. More specifically, the distance between the first plane X1 and the second plane X2 can be different from zero, for example it can be equal to a predetermined distance d.

Moreover, the first plane X1 and the second plane X2 can also not be parallel to the ground, for example they can be inclined with respect to the ground.

In the embodiment shown in the figures, the first moving means 3 comprise a toothed wheel suitable for housing the objects T1 in the space between one tooth and the other of the toothed wheel. Similarly, the second moving means 4 comprise a toothed wheel suitable for housing the objects T2 in the space between one tooth and the other of the toothed wheel. The number of teeth comprised in each wheel 3, 4 can be more than two.

Each toothed wheel 3, 4 rotates at a constant speed, the same for both, so as to make each object T1, T2 follow a path along an arc of circumference C1, C2, according to the group A or B to which the object belongs. More specifically, the objects T1 belonging to the first group A rotate in an anti-clockwise or counter-clockwise direction along a first arc of circumference C1 and the objects T2 belonging to the second group B rotate in a clockwise direction along a second arc of circumference C2. The distance between one tooth and the other of each wheel 3, 4 is preferably as small as possible, so as to reduce the angular speed with which each wheel 3, 4 turns to the minimum.

Actuation means, for example an electric motor, are suitable for moving, preferably in a synchronous manner, the first transportation means 1 and the second transportation means 2 and the first moving means 3 and the second moving means 4, so as to ensure the correct movement of the objects T. For example, the actuation means can be configured so that the speed with which the transportation means 1, 2 carry the objects belonging to the first group A and to the second group B, respectively, is such as to ensure that each object T1, T2 ends up inside the respective toothed wheel 3, 4, between one tooth and the other thereof, without the objects T1, T2 gathering on top of each other and without them leaving empty spaces between one tooth and the other of the toothed wheel 3, 4.

In the case shown in the figures, the first arc of circumference C1 and the second arc of circumference C2 are substantially semi-circular. The length of the first arc of circumference C1 and/or of the second arc of circumference C2 is variable.

The arcs of circumference C1 and C2 can also have a very short length, for example corresponding to ⅓, ¼, ⅕, ⅙ or ⅛ of the arc of circumference.

Figure 3:
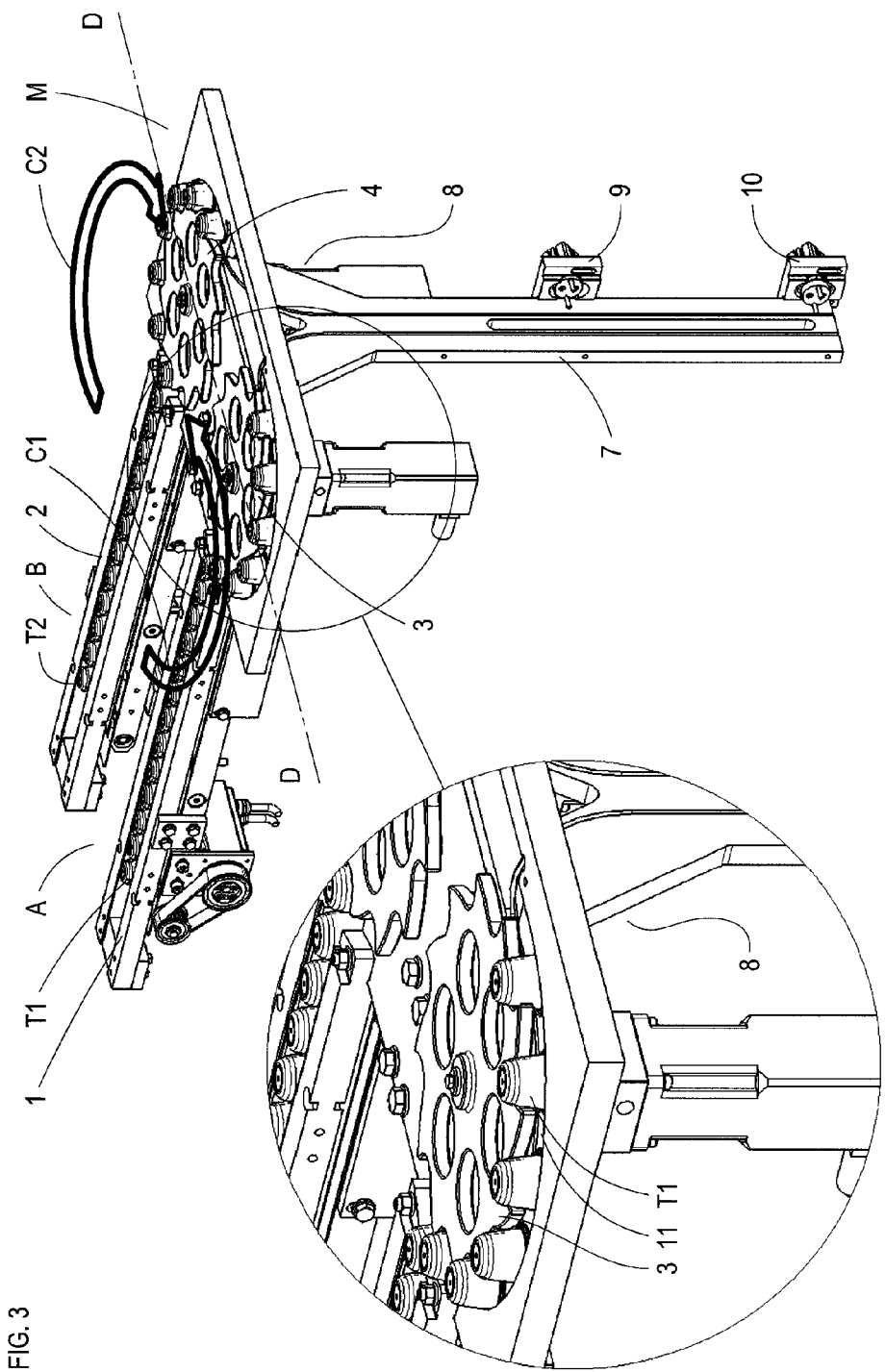
FIG. 3 schematically illustrates a 3D or perspective view of the machine for arranging objects shown in FIG. 2, in a further step of use.

In FIG. 3, the objects T1, T2, after having been transported by the conveyor belts 1, 2, have been inserted in the space between one tooth and the other of each of the two toothed wheels 3, 4, respectively. The toothed wheels 3, 4, rotating, ensure that the objects T1, T2 move along the arcs of circumference C1 and C2, respectively. In particular, the objects T1 belonging to the first group A move along the arc of circumference C1 and the objects T2 belonging to the second group B move along the arc of circumference C2.

Figure 3A:
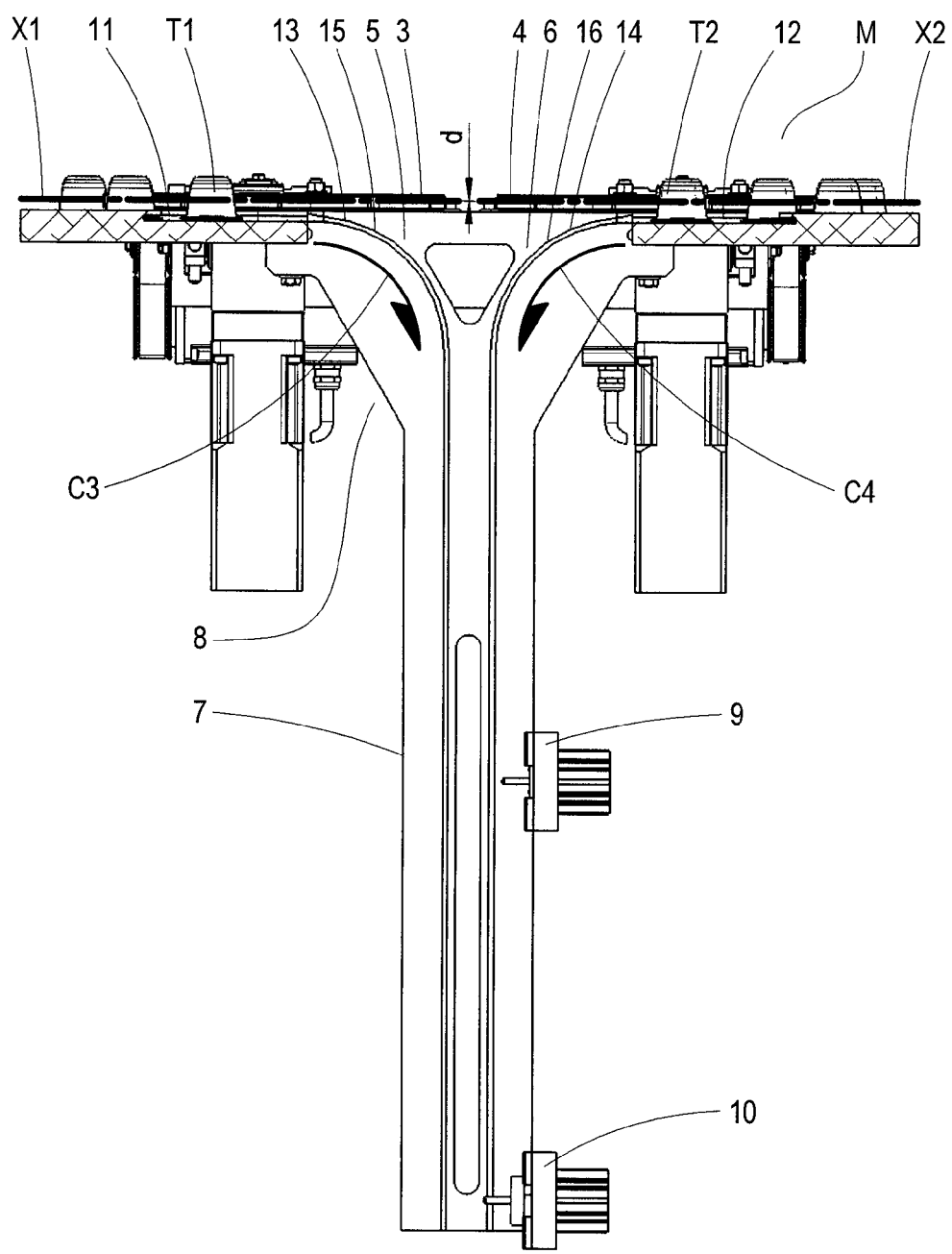
FIG. 3a schematically illustrates a section view, along the direction D-D shown in FIG. 2, of the machine for arranging objects shown in FIG. 2.

As can be seen more clearly in FIG. 3a, the first transportation means 3 and the second transportation means 4 can comprise, respectively, a first arched slit 11 and a second arched slit 12 suitable for housing the projecting edge Tb of the objects T1, T2, during the movement along the first arc of circumference C1 and/or along the second arc of circumference C2. In this way, the objects T1, T2 are prevented from coming out from the machine M during their movement along the arcs of circumference C1 and C2. Moreover, in this way the objects T1, T2 are more easily and effectively guided along the movement path.

In the system shown in FIGS. 2 to 6 the objects T1, T2 to be arranged in an alternate manner along single file rows are input into the toothed wheels along a radial direction, namely along a direction which is substantially coincident with the direction of one of the radiuses of the circumference defined by the corresponding toothed wheel during its rotation.

However, according to alternative embodiments of the present invention, the objects T1, T2 may be input into the toothed wheels along a tangential direction, namely a direction which is coincident with a tangent of the circumference defined by the corresponding toothed wheel during its rotation. The direction of the movement of the objects towards the toothed wheels advantageously corresponds to the rotation direction of the toothed wheels so as to optimize the grabbing of the objects by means of the toothed wheels. This embodiment is particularly advantageous because the input of objects to be arranged in an alternate manner in single file rows between the teeth of the toothed wheels is eased. In particular, this embodiment allows minimizing the probability that one or more of the gaps between the teeth of one or both of the toothed wheels are not occupied by objects to be arranged. Examples of such an embodiment are shown in FIGS. 7 to 10. As can be seen in these figures, in fact, the objects T1 belonging to the first group A are input into the first toothed wheel 3 in a tangential manner. In particular, the first tracks system 31 develops along a direction which is coincident with a tangent of the circumference defined by the first toothed wheel 3 during its rotation. The same holds true for the objects T2 belonging to the second group B, that is the second tracks system 32 develops along a direction which is coincident with a tangent of the circumference defined by the second toothed wheel 4 during its rotation so that the objects T2 are input into the second toothed wheel 4 in a tangential manner.

The machine M also comprises collecting and dropping means 8 suitable for receiving the objects T1 of the first group A from the first moving means 3 and the objects T2 of the second group B from the second moving means 4 and for making them fall along the same direction Y, preferably perpendicular to the ground.

The collecting and dropping means 8 comprising first rotation means 5 suitable for rotating the objects T1 of the first group A in a clockwise direction along a third arc of circumference C3 during falling so that, at the end of said rotation, the objects T1 no longer rest on the first end Te and second rotation means 6 suitable for rotating the objects T2 of the second group B in an anti-clockwise direction along a fourth arc of circumference C4 during falling so that, at the end of the rotation, the objects T2 no longer rest on the first end Te.

The rotation in a clockwise direction of the objects T1 of the first group A along the third arc of circumference C3 and the rotation in an anti-clockwise direction of the objects T2 of the second group B along the fourth arc of circumference C4 can be substantially 90°.

In the embodiment shown in the figures, the first rotation means 5 comprise a first joining guide 15 between the first moving means 3 and the guide 7. Similarly, the second rotation means 6 comprise a second joining guide 16 between the second moving means 4 and the guide 7.

The first joining guide 15 between the first moving means 3 and the guide 7, in the embodiment shown in the figures, has the profile of the arc of circumference C3. Similarly, the second joining guide 16 between the second moving means 4 and the guide 7 has the profile of the arc of circumference C4.

The first rotation means 5 also comprise a third arched slit 13 suitable for housing the projecting edge Tb of the objects T1 belonging to the first group A during their rotation. The second rotation means 6 comprise, similarly, a fourth arched slit 14 suitable for housing the projecting edge Tb of the objects T2 belonging to the second group B during their rotation.

Figure 4:
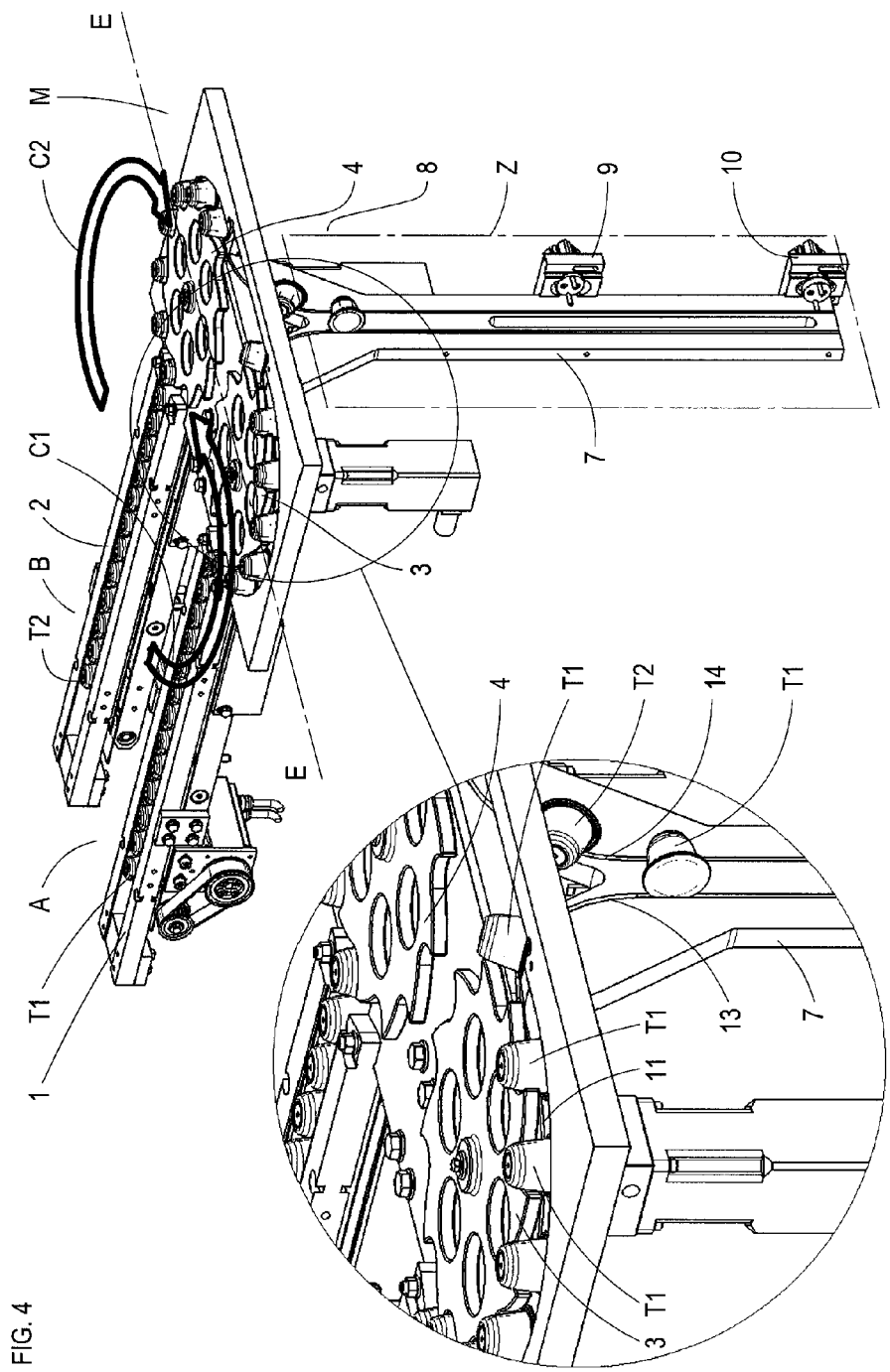
FIG. 4 schematically illustrates a 3D or perspective view of the machine for arranging objects shown in FIG. 2, in a further step of use.
Figure 4A:
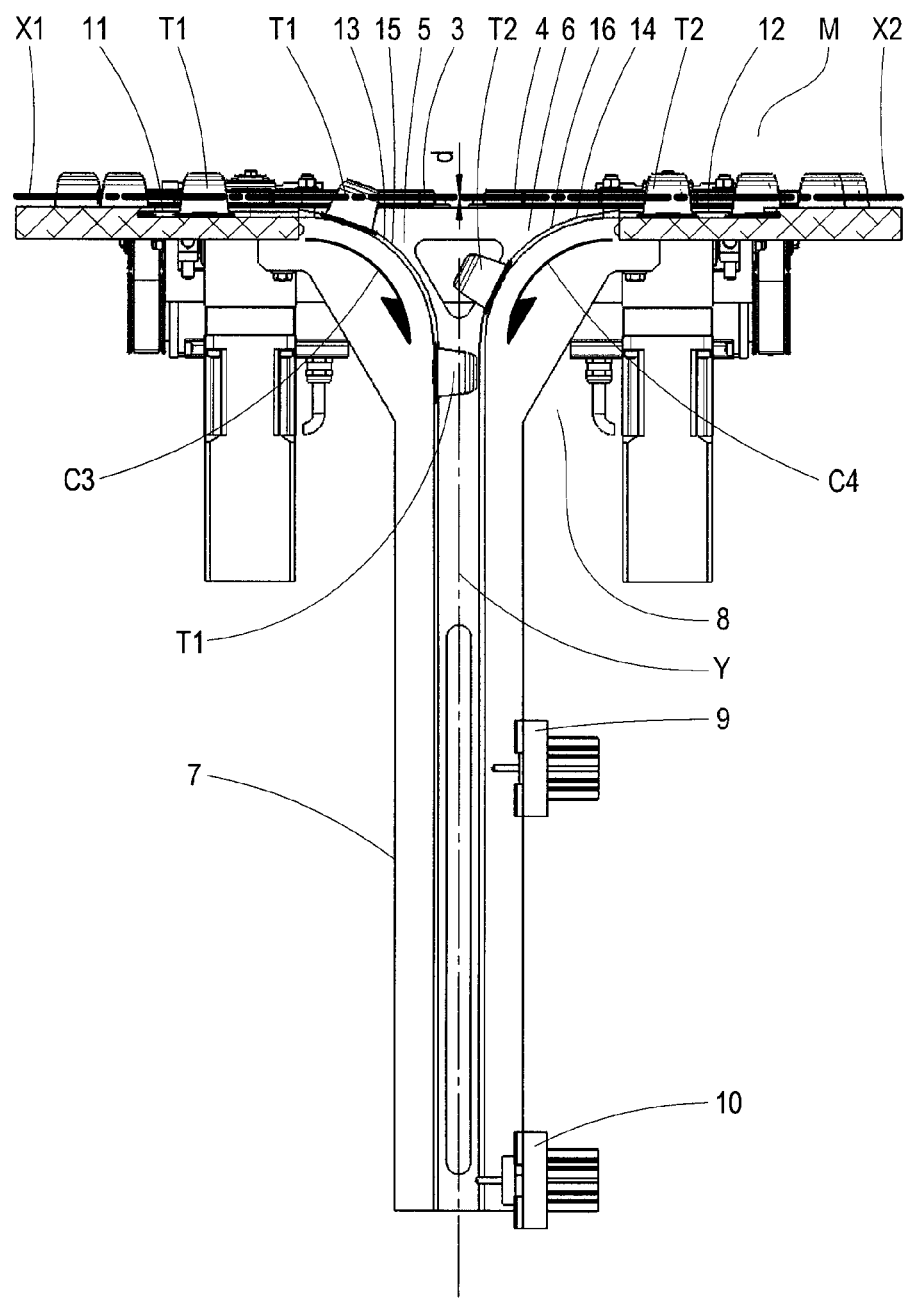
FIG. 4a schematically illustrates a section view, along the direction E-E shown in FIG. 4, of the machine for arranging objects shown in FIG. 4.

As can be clearly seen in FIG. 4a, the rotation substantially by 90° of the objects T1, T2, along the third arc of circumference C3 and/or along the fourth arc of circumference C4, is permitted by the fact that the projecting edge Tb of the objects T1, T2 is inserted inside the third and/or fourth arched slit 13, 14, respectively. The third arched slit 13 indeed, ensures, holding the edge Tb of the objects T1 inside it, the rotation by substantially 90° of the same objects T1 coming from the first toothed wheel 3, so that at the end of the rotation the objects T1 no longer rest on their first end Te. Similarly, the fourth arched slit 14 ensures, holding the edge Tb of the objects T2 inside it, the rotation by substantially 90° of the same objects T2 coming from the second toothed wheel 4, so that at the end of the rotation the objects T2 no longer rest on their first end Te.

The first rotation means 5 and the second rotation means 6 are also made so that the third arc of circumference C3 and the fourth arc of circumference C4, along which the objects T1 belonging to the first group A and the objects T2 belonging to the second group B respectively rotate, are defined on a plane Z perpendicular with respect to the first plane X1 and to the second plane X2, so as to stack the objects T1, T2 on top of one another in an alternate manner along single file rows F.

The guide 7, for example a vertical guide, is suitable for containing at least one single file row F of objects T.

In order to ensure that the first rotation means 5 and the second rotation means 6 allow the objects T1, T2 to be stacked on top of each other in an alternate manner along single file rows F, the first moving means 3 and the second moving means 4 are configured so that the objects T1 belonging to the first group A and the objects T2 belonging to the second group B arrive, respectively passing through the first rotation means 5 and the second rotation means 6, in turns, in the guide 7.

More specifically, if, like in the embodiments shown in the figures, the first arc of circumference C1 and the second arc of circumference C2 are on a first plane X1 and on a second plane X2, respectively, coinciding with each other, then the first moving means 3 and the second moving means 4 move in an offset manner, so that the first rotation means 5 and the second rotation means 6 receive an object T1 belonging to the first group A and an object T2 belonging to the second group B in turns, i.e. not simultaneously. In this way, for example, in a first moment an object T1 belonging to the first group A reaches the guide 7 and only thereafter, in a second moment, an object T2 belonging to the second group B reaches the guide 7. Thereafter, an object belonging to the first group A reaches the guide 7 and so on.

If, on the other hand, for example, the first arc of circumference C1 and the second arc of circumference C2 are on a first plane X1 and on a second plane X2, respectively, parallel but not coinciding, then the first moving means 3 and the second moving means 4 can move in phase. If, indeed, the first transportation means 3 and the second transportation means 4 are on different levels, the first rotation means 5 and the second rotation means 6 will also be on different levels. In this way, even if the first rotation means 5 and the second rotation means 6 respectively receive the objects T1, T2 simultaneously, they will reach the guide 7 in turns, because they will have different falling times.

FIG. 4 shows the machine M in which the objects T1, T2 have reached the first rotation means 5 and the second rotation means 6. More specifically, in the case shown in FIG. 4, the toothed wheels 3, 4 are on the same plane parallel to the ground and move in an offset manner. In this way, the first rotation means 5 and the second rotation means 6 receive the objects coming from the first toothed wheel 3 and from the second toothed wheel 4, in turns.

The objects T, therefore, when they reach the guide 7, are arranged on top of one another in an alternate manner. In particular, the objects T are arranged on top of one another so as to be parallel to each other. However, the objects T are oriented in an opposite manner. In particular, the corresponding ends of adjacent objects T point in opposite directions. The objects T are oriented so that the projecting edge Tb arranged in proximity to the first end Te of the first object T is in contact with the part opposite the projecting edge Tb of the second object T, which in turn is in contact with the projecting edge Te arranged in proximity to the first end Te of the third object T and so on. This alternate structure repeats along the entire single file row F.

The machine M shown in FIGS. 2 to 6 further comprises first blocking means 10 suitable for blocking the falling of the objects T in the single file row F. The machine M shown in FIGS. 2 to 6 further comprises second blocking means 9 suitable for dividing the single file row F of objects T into groups G having a predetermined number of objects T. When the objects T fall into the guide 7, the bottom thereof is closed through first blocking means 10. The second blocking means 9, on the other hand, are open during the accumulation step. The first blocking means 10 and the second blocking means 9 can comprise pneumatic cylinders suitable for opening or closing, according to requirements.

Figure 5:
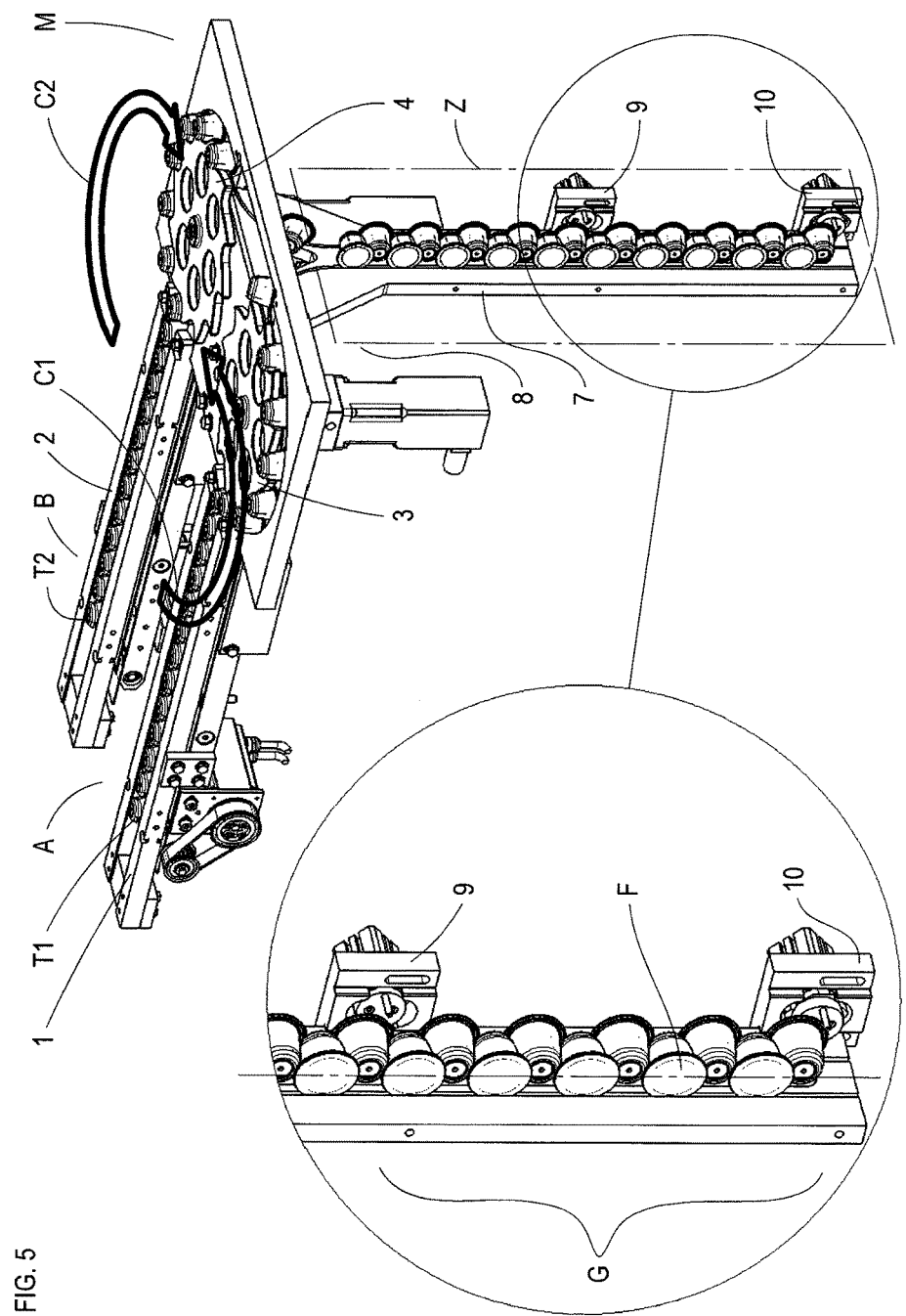
FIG. 5 schematically illustrates a 3D or perspective view of the machine for arranging objects shown in FIG. 2, in a further step of use.
Figure 6:
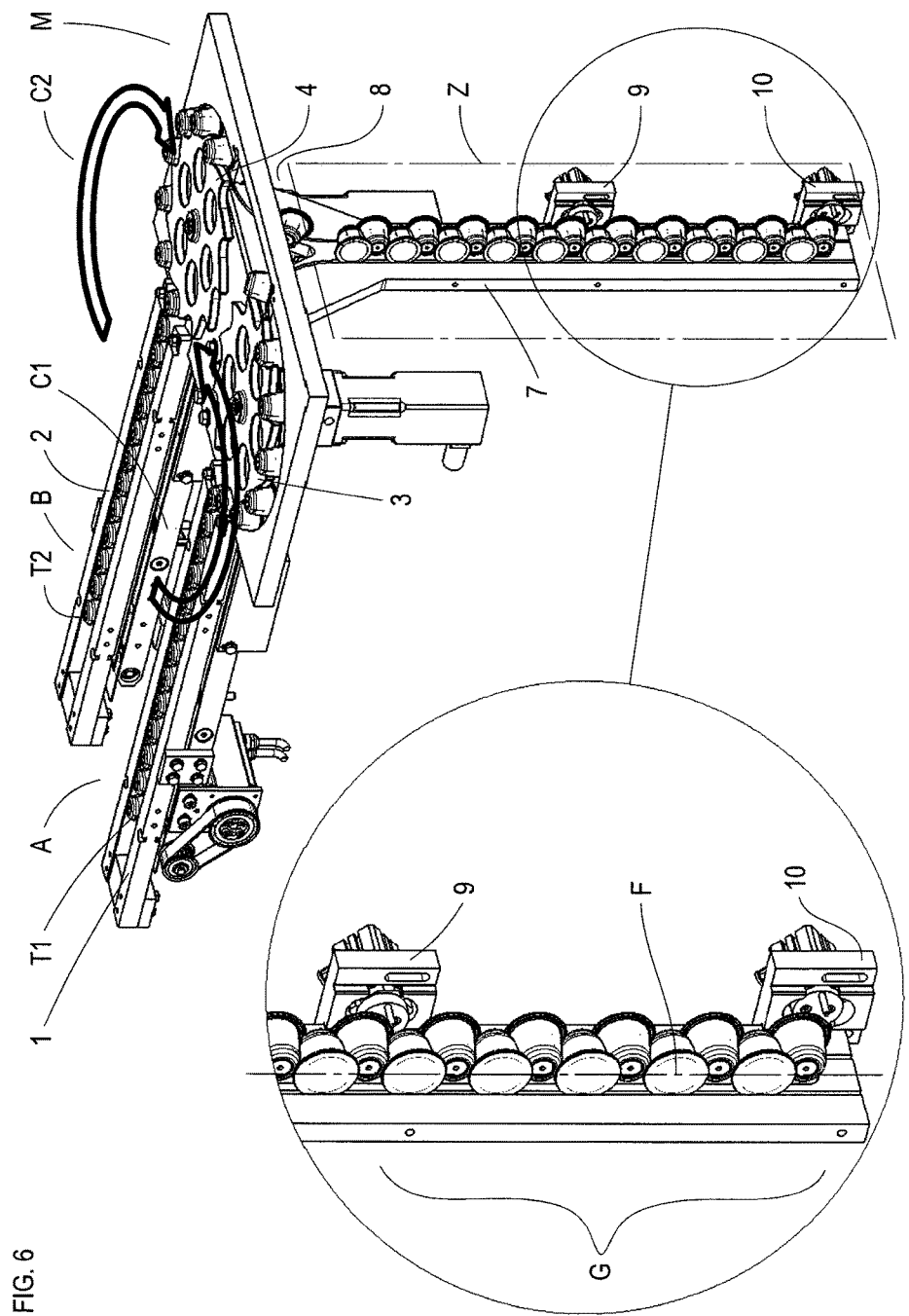
FIG. 6 schematically illustrates a 3D or perspective view of the machine for arranging objects shown in FIG. 2, in a further step of use.
Figure 7:
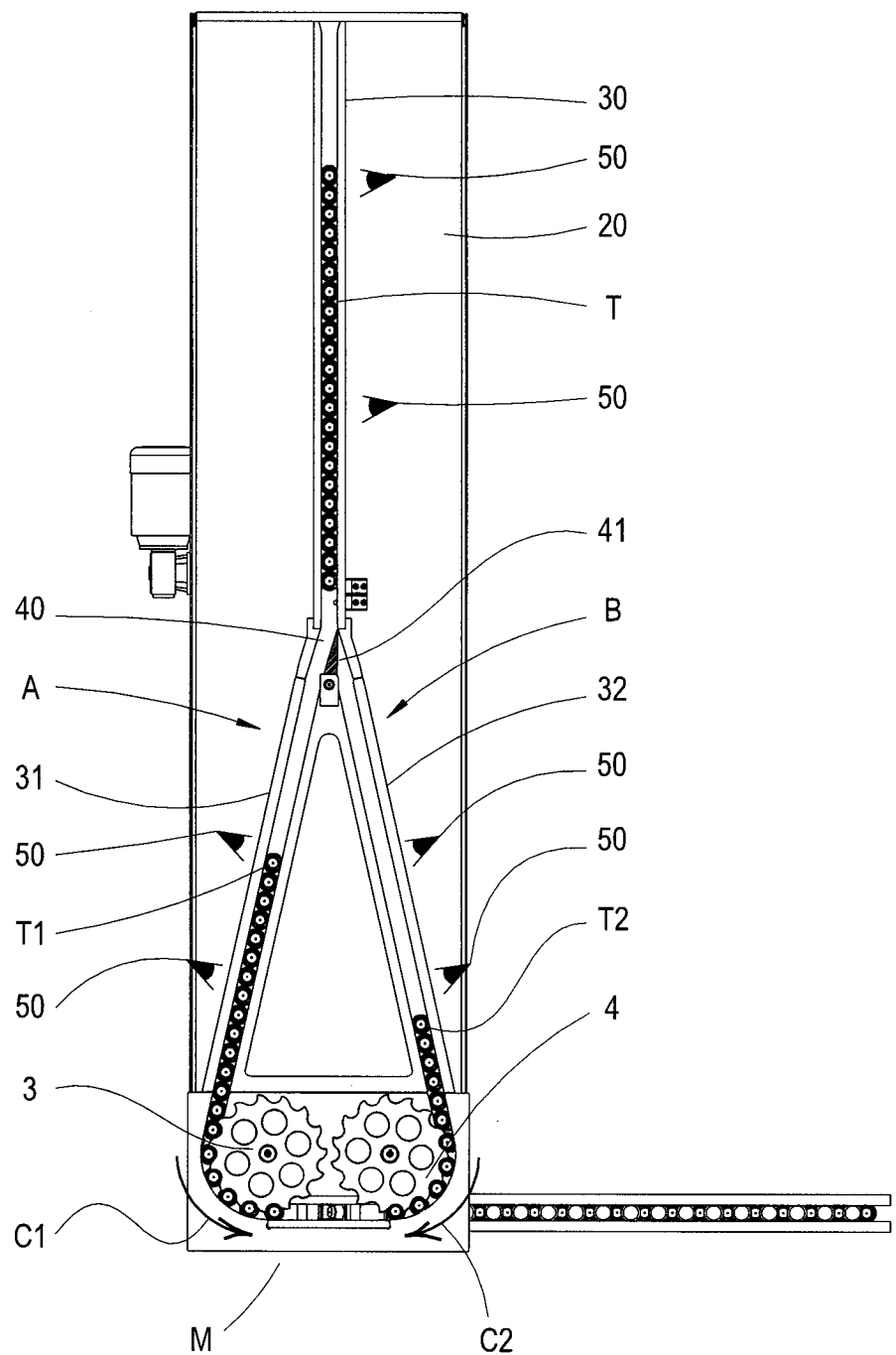
FIG. 7 schematically illustrates a plan view of a machine according to an embodiment of the present invention.

FIG. 5 shows the guide 7 filled with objects T arranged on top of each other in an alternate manner along a single file row F. The first blocking means 10 are closed, so as to block the falling of the objects T in the single file row F. Depending on the number of objects T wished to be packed, the second blocking means 9 are positioned along the guide 7 at a predetermined height. The second blocking means 9 are, indeed, suitable for dividing the single file row F of objects T into groups G having a predetermined number of objects T and therefore have an adjustable height. When the desired number of objects T has been collected in the guide 7, the second blocking means 9 are closed and the first blocking means 10 are opened, as shown in FIG. 6. In this way, the group G of objects T can be packed, if left to fall into a package H like the one shown in FIG. 1b. Once the group G of objects T has fallen, the first blocking means 10 are closed and the second blocking means 9 are opened. The process can be repeated to pack a subsequent group of objects T.

Figure 10:
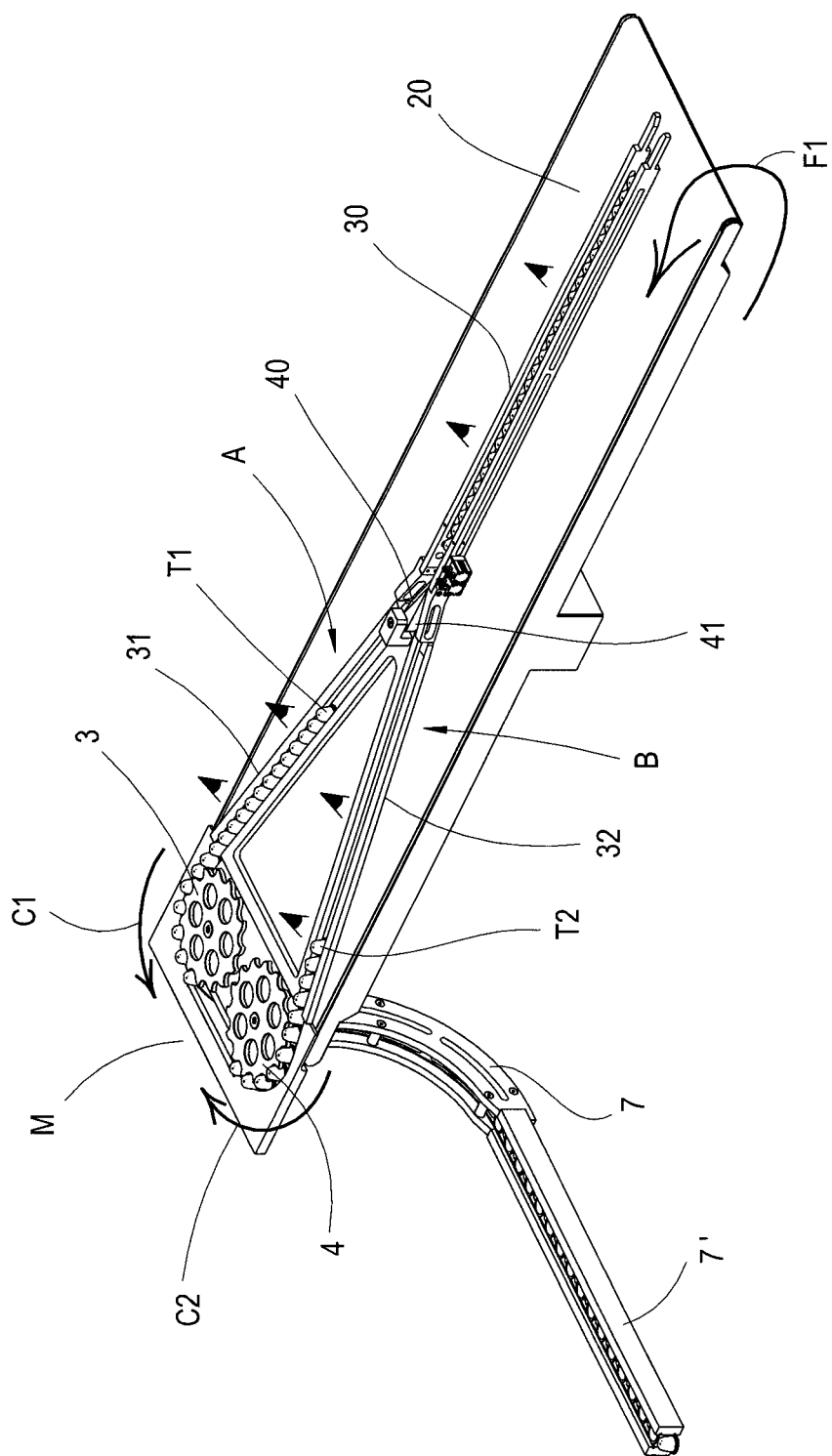
FIG. 10 schematically illustrates a 3D or perspective view of the system shown in FIG. 7.

According to alternative embodiments of the present invention, the guide 7 does not comprise blocking means and may be connected to a further guide, for example a guide which substantially oriented in a perpendicular direction with respect to the guide 7 shown in the figures, namely parallel to the ground. This second guide may be adapted to connect the machine according to the present invention with a packing machine which is adapted to insert the single file rows of objects oriented in an alternate manner into the corresponding packages. An example of a system according to this embodiment is schematically shown in FIG. 10, wherein it is visible that the guide 7 is connected to the guide 7' which is placed horizontally.

The method for arranging objects T comprising a first end Te and a projecting edge Tb arranged near to the first end Te, according to an embodiment of the present invention, therefore foresees the steps illustrated in FIGS. 2 to 6, which can be summarised as follows:

orienting the objects T so that they rest on the first end Te; dividing the objects T into a first group A and a second group B; moving the objects T1 belonging to the first group A in an anti-clockwise or counter-clockwise direction along a first arc of circumference C1 defined on a first plane X1 and, simultaneously, moving the objects T2 belonging to the second group B in a clockwise direction along a second arc of circumference C2 defined on a second plane X2 parallel to the first plane X1; dropping the objects T1 belonging to the first group A and the objects T2 belonging to the second group B in turn along the same direction Y, preferably perpendicular to the ground; rotating, during the falling step, the objects T1 belonging to the first group A in a clockwise direction along a third arc of circumference C3 so that, at the end of the rotation, the objects T1 no longer rest on the first end Te and rotating, during the falling step, the objects T2 belonging to the second group B in an anti-clockwise direction along a fourth arc of circumference C4 so that, at the end of the rotation, the objects T2 no longer rest on the first end Te, the third arc of circumference C3 and the fourth arc of circumference C4 being defined on a plane Z perpendicular with respect to the first plane X1 and to the second plane X2, so as to stack the objects T on top of each other in an alternate manner along single file rows F.

The rotation in a clockwise direction of the objects T1 of the first group A along the third arc of circumference C3 and the rotation in an anti-clockwise or counter-clockwise direction of the objects T2 of the second group B along the fourth arc of circumference C4 can be substantially by 90°.

The movement of the objects T1 belonging to the first group A along the first arc of circumference C1 can be offset with respect to the movement of the objects T2 belonging to the second group B along the second arc of circumference C2.

The projecting edge Tb of the objects T1, T2 can be housed in a third arched slit 13 and/or in a fourth arched slit 14, respectively, during the step of rotation of the falling step.

The present invention further provides a method for packing a predetermined number of objects T arranged in an alternate manner along single file rows F in a package H. This method for packing comprises the arrangement of the objects T in an alternate manner along single file rows according to the present invention, for example according to the method explained above. A predetermined number of objects which are arranged in an alternate manner in a single file row are inserted into the package H.

Even though the present invention has been described with reference to the embodiments described above, it is clear to those skilled in the art that it is possible to make different modifications, variations and improvements of the present invention in light of the teaching described above and encompassed by the attached claims, without departing from the object and the scope of protection of the invention.

For example, the transportation means can comprise different systems with respect to the toothed wheels, for example conveyor belts having a curvilinear shape or mechanical arms that move the objects along the arcs of circumference.

The machine for arranging objects in an alternate manner in single file rows can also be of various dimensions.

The machine according to the present invention can be integrated in a machine for producing capsules or in a machine for packaging them. Alternatively, the machine according to the present invention can operate as a connection element between a machine for producing capsules and one for packaging them.

Finally, those areas that are considered known to those skilled in the art have not been described in order to avoid needlessly cloud the invention described.

Consequently, the invention is not limited to the embodiments described above, but is only limited by the scope of protection of the attached claims.

What is claimed is:

1. Machine for arranging objects comprising a first end and a projecting edge arranged in proximity to said first end, in an alternate manner along single file rows, comprising:
   first transportation means for transporting a first group of said objects and second transportation means for transporting a second group of said objects;
   first moving means for receiving said objects of said first group from said first transportation means and for moving said objects belonging to said first group in an anti-clockwise direction along a first arc of circumference defined on a first plane;
   second moving means for receiving said objects of said second group from said second transportation means and for moving said objects belonging to said second group in a clockwise direction along a second arc of circumference defined on a second plane parallel to said first plane; and
   collecting and dropping means for receiving said objects of said first group from said first moving means and said objects of said second group from said second moving means and for dropping them along the same direction, said collecting and dropping means comprising first rotation means for rotating said objects of said first group in a clockwise direction along a third arc of circumference while falling, so that, at the end of said rotation, said objects do not rest on said first end, and second rotation means for rotating said objects of said second group in an anti-clockwise direction along a fourth arc of circumference while falling, whereby at the end of said rotation said objects no longer rest on said first end, said third arc of circumference and said fourth arc of circumference being defined on a plane perpendicular with respect to said first plane and to said second plane, so as to stack said objects on top of one another in an alternate manner along single file rows.

2. Machine according to claim 1, wherein:
   said rotation in a clockwise direction of said objects of said first group along said third arc of circumference and said rotation in an anti-clockwise direction of said objects of said second group along said fourth arc of circumference are substantially by 90°.

3. Machine according to claim 1, wherein:
   said first plane and said second plane coincide with each other and/or are parallel to each other.

4. Machine according to claim 1, wherein:
   said first moving means and/or said second moving means comprise a toothed wheel for housing each of said objects in the space between adjacent teeth of said toothed wheel during the movement of said objects.

5. Machine according to claim 1, wherein:
   said first rotation means comprise an arched slit for housing said projecting edge of said objects belonging to said first group during said rotation and/or said second rotation means comprise an arched slit for housing said projecting edge of said objects belonging to said second group during said rotation.

6. Machine according to claim 1, wherein:
   said collecting and dropping means comprise a guide capable of containing at least one single file row of said objects.

7. Machine according to claim 6, further comprising:
   first blocking means, associated with the guide, for blocking the falling of said objects in said single file row.

8. Machine according to claim 7, further comprising:
   second blocking means, associated with the guide, for dividing said single file row of said objects into groups having a predetermined number of said objects.

9. Machine according to claim 1, further comprising:
   actuation means for moving said first transportation means, said second transportation means, said first moving means, and said second moving means.

10. Method for arranging objects, comprising a first end and a projecting edge arranged in proximity to said first end, in an alternate manner along single file rows, comprising the steps of:
   orienting the objects so that the objects rest on the first end;
   dividing said objects into a first group of objects and a second group of objects;
   moving the objects belonging to the first group in an anti-clockwise direction along a first arc of circumference defined on a first plane and, simultaneously, moving said objects belonging to said second group in a clockwise direction along a second arc of circumference defined on a second plane parallel to the first plane;
   making the objects belonging to the first group and the objects belonging to the second group fall in an alternate manner along the same direction;
   rotating, during said step of making the objects belonging to the first group and the objects belonging to the second group fall, the objects belonging to the first group in a clockwise direction along a third arc of circumference so that, at the end of said step of rotating, the objects no longer rest on the first end, and rotating the objects belonging to the second group in an anti-clockwise direction along a fourth arc of circumference so that, at the end of said step of rotating, said objects no longer rest on the first end, the third arc of circumference and the fourth arc of circumference being defined on a plane perpendicular with respect to the first plane and to the second plane, so as to stack the objects on top of one another in an alternate manner along single file rows.

11. Method according to claim 10, wherein:
said step of rotating in a clockwise direction the objects of the first group along the third arc of circumference and in an anti-clockwise direction the objects of the second group along the fourth arc of circumference are substantially by 90°.

12. Method according to claim 10, wherein:
the objects are frusto-conical.

13. Method according to claim 10, wherein:
the objects are capsules for producing drinks.

14. Method according to claim 10, wherein:
the first plane and the second plane coincide and/or are parallel to each other.

15. Method according to claim 10, wherein:
the movement of the objects belonging to the first group along the first arc of circumference is offset with respect to the movement of the objects belonging to the second group along the second arc of circumference.

16. Method according to claim 10, wherein:
the projecting edge of the objects belonging to the first group is housed in a third arched slit during said step of rotating and/or the projecting edge of the objects belonging to the second group is housed in a fourth arched slit during said step of rotating.

17. Method for stacking a predetermined number of objects in an alternate manner along single file rows in a package, comprising the arrangement of the predetermined number of objects in an alternate manner along single file rows according to the method of claim 10.

18. Method according to claim 10 further comprising:
placing a predetermined number of the objects in the alternate manner along single file rows in a package.

* * * * *